US006805473B2

(12) United States Patent
Beard

(10) Patent No.: US 6,805,473 B2
(45) Date of Patent: Oct. 19, 2004

(54) BICYCLE LIGHT

(76) Inventor: Daniel John Beard, Woodside, West Common, Langley, Southampton, Hampshire (GB), SO45 1XL ( * ) Notice: Subject to any disclaimer, the term of this patent is extended or adjusted under 35 U.S.C. 154(b) by 0 days.

(21) Appl. No.: 10/475,248
(22) PCT Filed: Apr. 17, 2002
(86) PCT No.: PCT/GB02/01767
§ 371 (c)(1),
(2), (4) Date: Oct. 20, 2003
(87) PCT Pub. No.: WO02/085694
PCT Pub. Date: Oct. 31, 2002

(65) Prior Publication Data
US 2004/0114383 A1 Jun. 17, 2004

(30) Foreign Application Priority Data
Apr. 20, 2001 (GB) .............................................. 0109724

(51) Int. Cl.[7] .......................................... F21W 101/02
(52) U.S. Cl. ....................... 362/474; 362/473; 362/545; 362/549; 362/523; 340/468
(58) Field of Search ................................ 362/543–545, 362/473–476, 540, 549, 523; 340/468

(56) References Cited

U.S. PATENT DOCUMENTS

| 4,337,503 A |   | 6/1982 | Turner ......................... 362/72 |
| 4,875,142 A | * | 10/1989 | Spector ....................... 362/474 |
| 4,970,630 A | * | 11/1990 | Mudrovich ................... 362/476 |
| 5,008,782 A |   | 4/1991 | Murray ........................ 340/468 |
| 5,247,431 A |   | 9/1993 | Liu .............................. 362/72 |
| 5,418,696 A | * | 5/1995 | Izzo, Sr. ...................... 362/473 |
| 5,795,050 A |   | 8/1998 | Carter .......................... 362/72 |
| 5,872,510 A |   | 2/1999 | O'Shaugnessy ............. 340/468 |
| 5,933,076 A | * | 8/1999 | Babb ........................... 340/475 |
| 6,081,190 A | * | 6/2000 | Kellermann ................. 340/465 |

FOREIGN PATENT DOCUMENTS

| CH | 635284 A | 3/1983 |
| DD | 119181 A | 4/1976 |
| DE | 29604320 U | 10/1996 |
| EP | 1160149 A | 5/2001 |
| GB | 2140905 A | 12/1984 |
| GB | 2298702 A | 9/1996 |
| GB | 2335733 A | 9/1999 |
| GB | 2345675 A | 7/2000 |

* cited by examiner

Primary Examiner—Laura K. Tso
(74) Attorney, Agent, or Firm—John V. Stewart

(57) ABSTRACT

A bicycle light comprises a light head (18) operable to emit light of one color such as white in one direction and light of another color such as red in the opposite direction, and a mounting (20, 24) for attaching the light head to an end of a bicycle's handlebars (12), preferably the off-side end of the handlebars. The bicycle light enhances the visibility of the cyclist by adopting a novel position for the light, and it also encourages motorists to give the cyclist a wider berth while overtaking. The mounting may include a flexible stem (20), and in one embodiment the stem may be retractable into the handlebars.

19 Claims, 4 Drawing Sheets

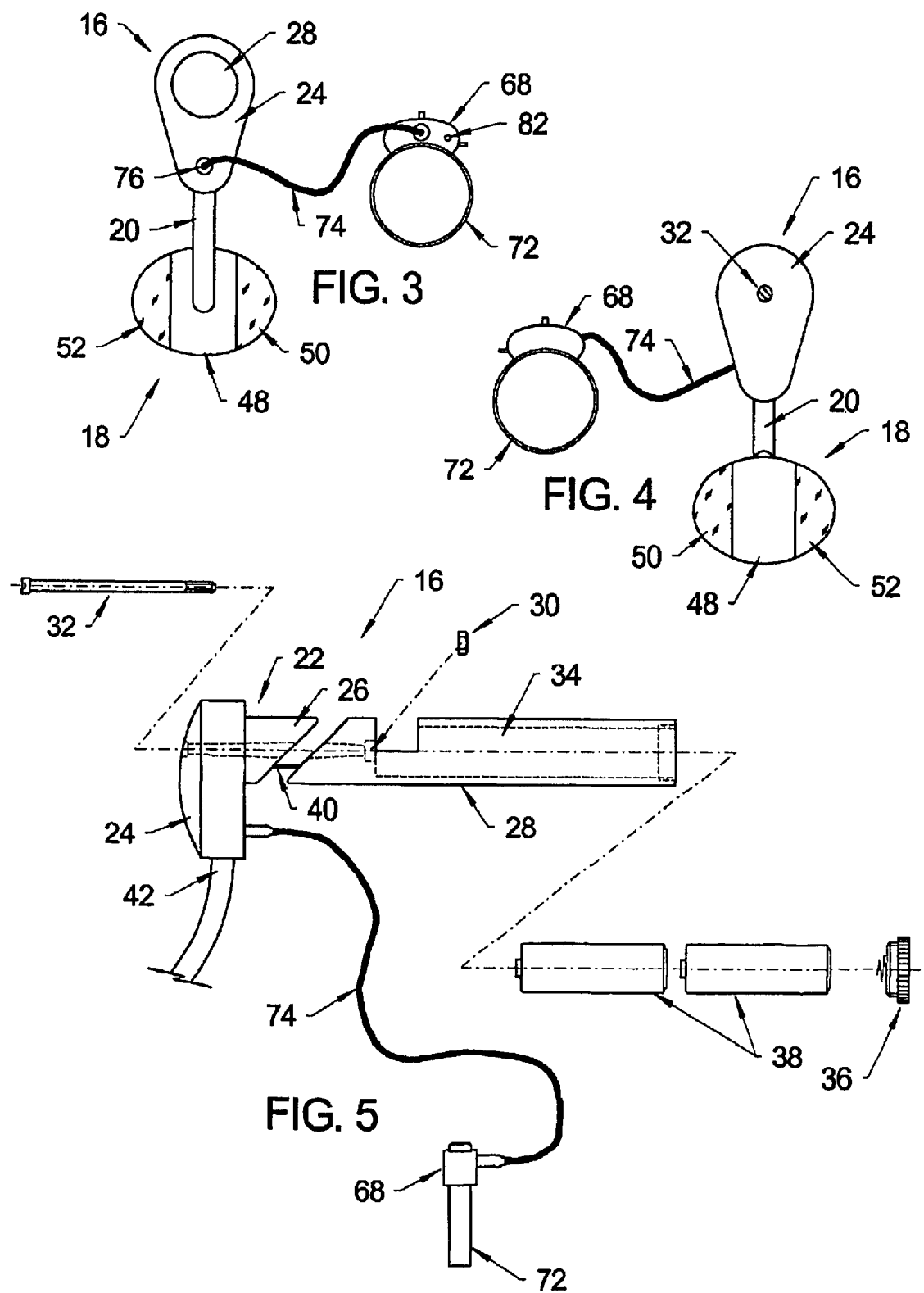

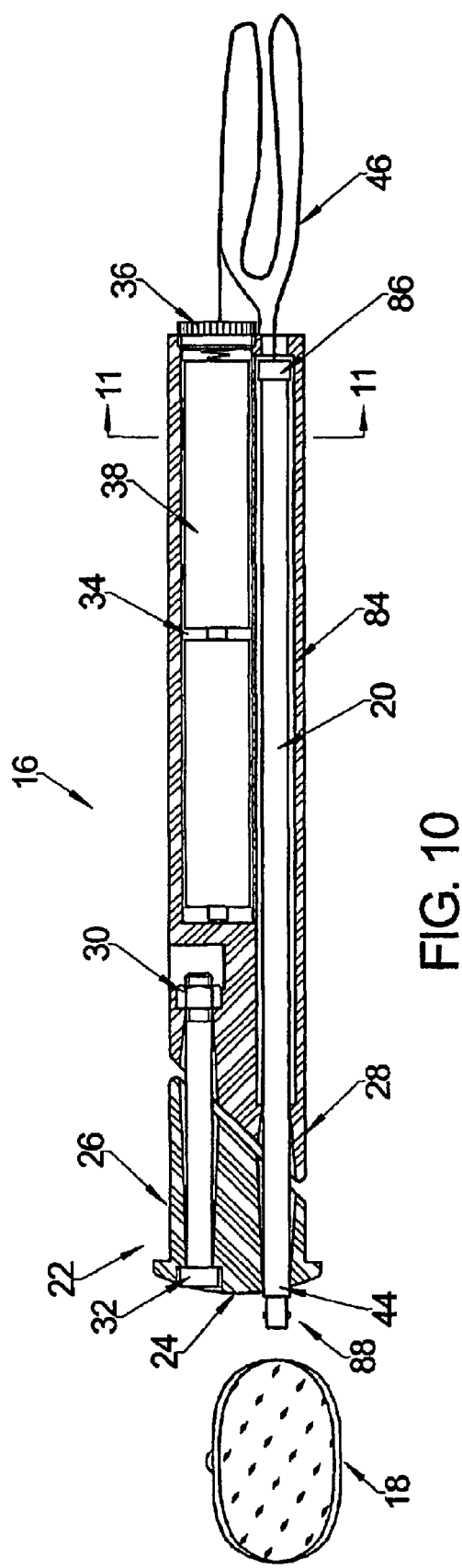
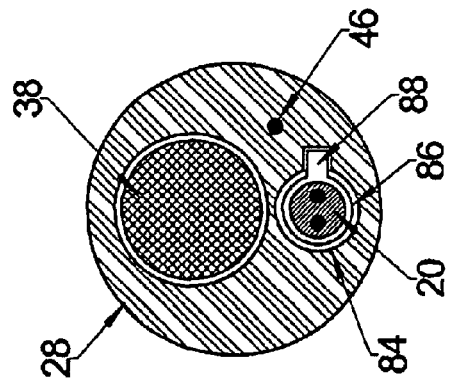
FIG. 10
FIG. 11

BICYCLE LIGHT

DESCRIPTION

This invention relates to bicycle lights.

When dark, or when visibility is poor, it is a legal requirement in many countries for riders of bicycles to have fitted and use illuminated front and back bicycle lights so that they are visible to other road users. Conventionally, bicycles have been fitted with a white front light at the front of the bicycle and a red rear light at the back of the bicycle or to one side of its rear wheel.

The present invention is concerned with providing an improved form of bicycle lighting that may be used in addition to, or instead of, conventional lights.

In accordance with a first aspect of the invention, there is provided a bicycle light, comprising a light head operable to emit light of one colour in one direction and light of another, different colour in the opposite direction, and means for attaching the light head to an end of a bicycle's handlebars, preferably the off-side end of the handlebars. The bicycle light enhances the visibility of the cyclist by adopting a novel position for the light, and it also encourages motorists to give the cyclist a wider berth while overtaking.

Preferably, said one colour is white, arranged in use to show a white light to the front of the bicycle. However, LEDs are the preferred light sources and for reasons of cost reduction, said one colour may alternatively be tinted white. Preferably, said other colour is red, arranged in use to show a red light to the rear of the bicycle.

Preferably, the attaching means includes a flexible stem that protrudes from the handlebars, with one end of the stem being connected (and more preferably releasably connected) to the light head, and the other end being attachable to the handlebar end. This allows for variable positions of the light head in relation to the bicycle. Also when the light head is detached from the stem, the stem can be adjusted into a position that does not protrude from the bicycle.

In the case where the bicycle light is for use with a bicycle having a tubular handlebar end, the attaching means preferably includes a device which can be inserted into the tubular handlebar end and operated so as to grip the inner surface of the tubular handlebar end.

These latter features may be provided independently of the first aspect of the invention. Accordingly, a second aspect of the invention provides a bicycle light for a bicycle having a tubular handlebar end, the light comprising an attaching device which can be inserted into the tubular handlebar end and operated so as to grip the inner surface of the tubular handlebar end, a flexible stem projecting from the attaching device, and a light head connected or connectable to the distal end of the stem and operable to emit light.

In one embodiment, the stem is movable between an in-use position in which the stem projects substantially from the attaching device and a stowed position in which the majority of the stem is stowed within the handlebar end.

The bicycle light preferably further includes a battery pack for powering the light head. In the case of a tubular handlebar end, the battery pack is preferably arranged to be housed inside the tubular handlebar end. In this case, the stem preferably includes conductors for supplying electricity from the battery pack to the light head.

Devices that contain light emitting diodes (LEDs) that flash on and off at high speed will enhance the visibility of the bicycle and rider, and may decrease the possibilities of accidents by attracting the attention of other road users. These can be used in conjunction with other more traditional devices, to increase further the visibility of the rider and bicycle. The light unit is preferably capable of emitting a constant light or a flashing light.

A second such bicycle light (which is optional) could be fitted to the handlebars on the near side of the bicycle. A further optional feature is to embody LEDs into the light head casing that could be used as direction indicators by blinking intermittently. When activated by a switching mechanism affixed to the handlebars, a blinking orange or yellow light would be emitted from the front and back of the light head casing, providing other road users with a more visible indication of the cyclist's path.

Specific embodiments of the present invention will now be described, purely by way of example, with reference to the accompanying drawings, in which:

FIG. 3 is an end view in one direction of the bicycle light before fitting to the bicycle;

FIG. 4 is similar to FIG. 3, but viewed in the opposite direction;

FIG. 5 is an exploded side view of the bicycle light;

FIG. 10 is a sectioned side view of a second embodiment of bicycle light; and

FIG. 11 is a cross-sectioned view, on a larger scale, of the light of FIG. 10, taken along the section line 11—11.

Figure 1:
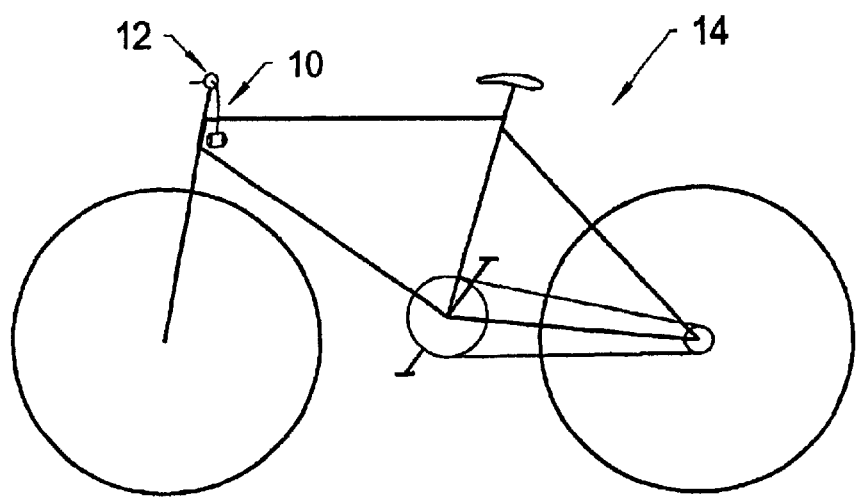
FIG. 1 is a side view of a bicycle fitted with a bicycle light of a first embodiment of the invention.
Figure 2:
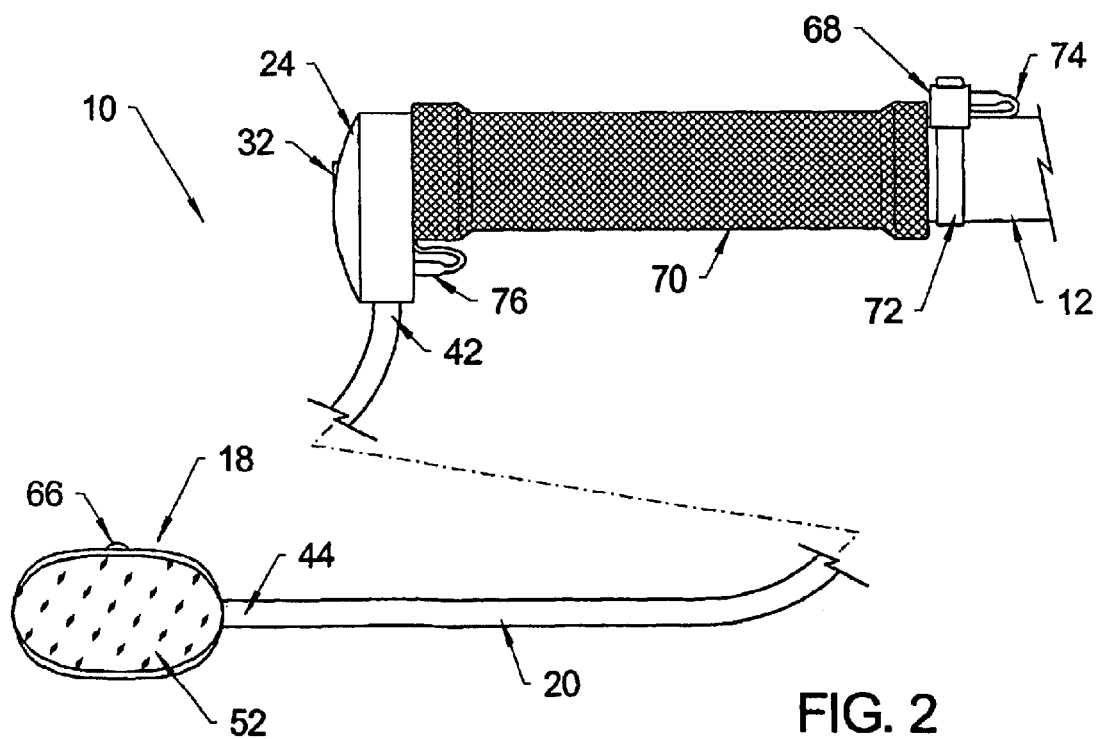
FIG. 2 is a fragmented rear view of the bicycle light of FIG. 1 and a handlebar end of the bicycle.
Figure 6:
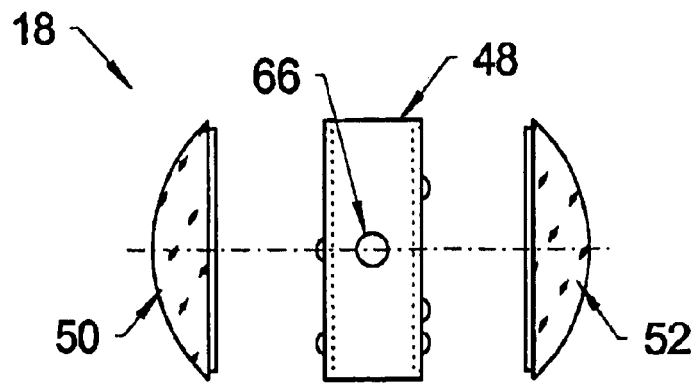
FIG. 6 is an exploded plan view of a light head of the bicycle light.

Referring to FIGS. 1 to 9 of the drawings, a bicycle light 10 is mounted on one end of the handlebars 12 of a bicycle 14. Typically, a similar bicycle light would also be mounted on the other end of the handlebars 12. The bicycle light 10 comprises a mounting assembly 16 mounted in and projecting from the end of the handlebars 12, a light head 18 and a flexible connector stem 20 connecting the light head 18 to the mounting assembly 16.

Referring in particular to FIG. 5, the mounting assembly 16 includes a first member 22 having a portion 24 that projects from the handlebars 12 and a cylindrical portion 26 that has an outside diameter slightly smaller than the inside diameter of the handlebars and that extends into the handlebars 12. The mounting assembly 16 also includes a second cylindrical member 28, also having an outside diameter slightly smaller than the inside diameter of the handlebars, extending further into the handlebars 12 and secured to the first member 22 by a nut 30 and bolt 32. The first and second members 22,28 have abutting faces that are inclined, so that when the nut and bolt 30,32 are tightened, the first and second members 22,28 become offset and grip the inner surface of the handlebars 12 to lock the mounting assembly 16 in position. The second member 28 provides a battery compartment 34 with a screw cap 36 for a pair of AA/MN1500/LR6 batteries 38 that are electrically connected to the first member 22 by wires 40, or by a wire and the bolt 32.

The flexible connector stem 20 is permanently connected at its proximal end 42 to the projecting portion 24 of the mounting assembly 16 and is releasably connected at its distal end 44 to the light head 18. The stem 20 is formed of flexible plastics material that will keep the shape into which it is bent, and it encloses two wires 46 for carrying electrical current from the batteries 38 to the head 18, and optionally a third wire in the case where a direction indicating function is also provided.

Figures 7, 8:
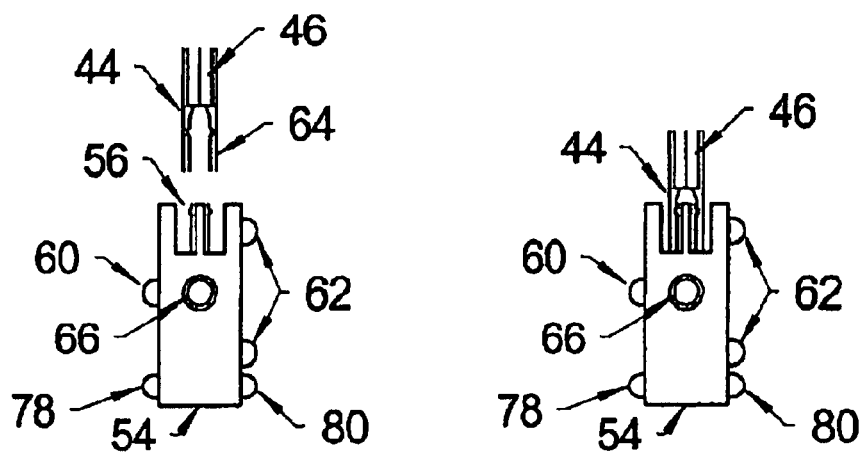
FIG. 7 is a plan view of a connector stem of the bicycle light and a circuit board inside the light head, with the connector stem and circuit board disconnected.
FIG. 8 is similar to FIG. 7, but with the connector stem and circuit board connected.
Figure 9:
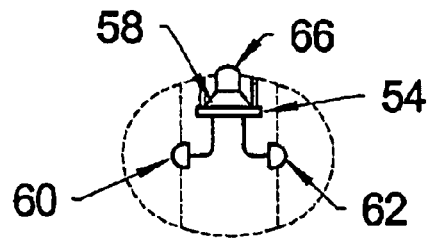
FIG. 9 is a side view illustrating the layout of components inside the light head.

The light head 18 comprises a central housing 48 that is covered at its front by a clear lens 50 and at its rear by a red lens 52. The lenses 50,52 are a snap fit onto the housing 48. A circuit board 54 is mounted inside the housing 48, and a male connector 56, push-button switch 58, white LED 60, two red LEDs 62 and flasher circuitry (not shown) are connected to the circuit board 54. Referring particularly to FIGS. 7 and 8, the distal end 44 of the stem 20 is provided with a female connector 64 that complements the male connector 56 so as to provide a releasable mechanical connection between the distal end 44 of the stem 20 and the light head 18 and an electrical connection between the wires 46 in the stem 20 and the circuit board 54. The switch 58 has a push-button 66 that projects from the top of the housing 48. The white LBD 60 is mounted on the circuit board 54 so as to face to the front and is covered by the clear lens 50, and the two red LEDs 62 are mounted on the circuit board 54 so as to face to the rear and are covered by the red lens 52. The circuitry is connected so that, from an off state, one press of the push-button 66 causes all three LEDs 60,62 to flash, another press of the push-button 66 causes all three LEDs 60,62 to emit a constant light, and a further press of the push-button 66 returns the circuitry to the off state.

When it is desired to use the bicycle light 10, the head 18 is connected to the distal end 44 of the stem 20 (if not already fitted), and the stem 20 is bent if required so that the head 18 assumes the desired position and with the clear lens 50 facing forwards and the red lens 52 facing to the rear. The push-button 66 is pressed once or twice so as to produce flashing lights or constant lights. After use, the push-button is pressed once of twice to switch the light off. Also, if desired, the head 18 may be removed from the distal end 44 of the stem 20 and placed, for example, in the user's pocket, and the stem 20 may be bent underneath the handlebars 12 out of the way. When the batteries 38 become exhausted, the bolt 32 is loosened sufficiently to enable the mounting assembly 16 to be withdrawn from the handlebar end, the cap 36 of the battery compartment 34 is removed, the batteries 38 are replaced, and the mounting assembly 16 is then re-fitted in the reverse order.

It will be appreciated that many modifications and developments may be made to the bicycle light 10 described above. For example, if the rear LEDs 62 are red, the rear lens 52 may be clear. Also, a direction indicating function may be provided, as shown in the drawings. For this, an indicator switch unit 68 is mounted on the handlebars 12, inboard of the handlebar grip 70, by a clip 72. The switch unit 68 is connected by a cable 74 that extends between the handlebar grip 70 and the handlebar end to a plug 76 that is connected to a complementary socket in the projecting portion 24 of the mounting assembly 16 and thence via a third wire 46 in the stem 20 and the connectors 56,64 to the light head 18. The circuit board 54 is provided with a yellow LED 78 that shows to the front through the clear front lens 50 and a further yellow LED 80 that shows to the rear through the rear lens 52 that in this case would also be clear. The indicator switch unit 68 may include a one-way switch, and the arrangement may be such that when the indicator switch unit 68 is turned on, the flasher circuitry causes the yellow LEDs 78,80 to flash. Alternatively, the indicator switch unit 68 may include a two-way centre-off switch, which is also connected via a socket 82 and a cable (not shown) to the bicycle light on the other side of the bicycle 14. In this case, the arrangement may be such that when the switch unit 68 is moved to one of the on positions, the yellow LEDs 78,80 in one of the light heads 18 flash, and when the switch unit 68 is moved to the other on position, the yellow LEDs 78,80 in the other light head 18 flash.

Furthermore, the number and type of batteries 38 may be modified, and the battery or batteries 38 may alternatively be housed in the light head 18, rather than in a battery compartment 34 in the handlebar end. In this case, the battery or batteries 38 may alternatively be in the form of button cells. In the case of a light without the direction indicating function, this obviates the need for electrical wires 46 extending through the stem 20 and the need for electrical connectors 56,64 that may be exposed to the elements. In this case also, the light head 18 may be provided with a clip so that it can be used clipped onto the cyclist's clothing, rather than being mounted on the handlebar end.

In the case where the batteries 38 are mounted in the end of the handlebars 12, the second member 28 may be formed of flexible material so that the battery compartment 34 can bend to accommodate any curvature of the end of the handlebars 12.

The switching and/or flashing circuitry may alternatively be provided in the mounting assembly 16, rather than in the light head 18.

The mounting assembly 16 may additionally be provided with a parking slot into which the stem 20 can be placed when the light 10 is not in use, and the slot may alternatively be used as a mounting place for an optional rear-view mirror. The slot is preferably designed so that the stem 20 or mirror releases from it on impact to reduce the risk of breakage.

The lenses 50,52 are preferably shaped or otherwise designed so as to project light to the sides in addition to the front or rear to increase the visibility of the cyclist from the side.

Furthermore, the flexible stem 20 may be arranged so that it can be slid in and out of the handlebar end, as in the embodiment shown in FIGS. 10 and 11. In those drawings, features similar to those described above with reference to FIGS. 1 to 9 have been marked with the same reference numerals. As can be seen, the batteries 38 and stem 20 are mounted side by side in the mounting assembly 16. The stem 20 is housed in a passageway 84 of greater diameter than the stem along most of its length. The inner end of the stem 20 is fitted with a sleeve 86 that is a sliding fit in the passageway 84. The sleeve has a key 88 that engages in a complementary keyway of the passageway 84 so that the stem 20 cannot be turned in the mounting assembly. The electrical wires 46 extend freely from the inner end of the stem 20 for a distance, and then one wire is connected via the cap 36 of the battery compartment to one terminal of the batteries 38, while the other wire 46 passes through a hole in the second member 28 of the mounting assembly 16 and is connected to the other terminal of the batteries 38. The other end 44 of the stem 20 projects from the first member 22 of the mounting assembly 16 and has a bayonet connector 88 for connection to a complementary connector in the light head 18 to provide positive locking, and electrical connection, of the head 18 to the stem 20. In addition to the stem 20 being flexible, the second member 28 of the mounting assembly 16 is also flexible so that it may bend, particularly in the region between the batteries 38 and the nut 30 and in the region between the two batteries 38, to accommodate any curvature of the end of the handlebars 12.

It will therefore be appreciated that when the light of FIGS. 10 and 11 is not in use, the stem 20 may be stowed in the passageway 84, with only the bayonet connector 88 projecting from the mounting assembly 16, as shown in FIG. 10. When it is desired to use the bicycle light, the light head 18 is attached to the bayonet connector 88, and the stem is withdrawn so that the majority of the length of the stem 20 projects from the mounting assembly 16.

In a modification of the bicycle light of FIGS. 10 and 11, a recess is provided in the first member 22 of the mounting assembly 16 so that when the stem 20 is in its stowed position, the bayonet connector 88 does not project at all from the first member, so as to protect the bayonet connector 88 from accidental damage.

In another modification of the bicycle light of FIGS. 10 and 11, the battery compartment 34 is mounted on the inner end of the stem 20 and is arranged so that the battery compartment slides in the handlebars of the bicycle as the stem is slid between its stowed and in-use positions.

In addition to being used with a conventional bicycle, the light 10 may also be used with other vehicles having handlebars, such as scooters and micro-scooters, and the term "bicycle" as used in this specification is intended to encompass such other vehicles.

It should be noted that the embodiments of the invention have been described above purely by way of example and that many other modifications and developments may be made thereto within the scope of the present invention.

What is claimed is:

1. A bicycle light, comprising a light head operable to emit light of one colour in one direction and light of another, different colour in the opposite direction, and means for attaching the light head to an end of a bicycle's handlebars, wherein the attaching means includes a flexible stem, one end of which is connected or connectable to the light head, and the other end of which is attachable to the handlebar end.

2. A bicycle light as claimed in claim 1, wherein said one colour is white, or tinted white, and said other colour is red.

3. A bicycle light for use with a bicycle having a tubular handlebar end, the bicycle light comprising a light head operable to emit light of one colour in one direction and light of another, different colour in the oposite direction, and means for attaching the light head to an end of a bicycle's handlebars, wherein the attaching means includes a device which can be inserted into the tubular handlebar end and operated so as to grip the inner surface of the tubular handlebar end.

4. A bicycle light for a bicycle having a tubular handlebar end, the light comprising an attaching device which can be inserted into the tubular handlebar end and operated so as to grip the inner surface of the tubular handlebar end, a flexible stem projecting from the attaching device, and a light head connected or connectable to the distal end of the stem and operable to emit light.

5. A bicycle light as claimed in claim 4, wherein the stem is movable between an in-use position in which the stem projects substantially from the attaching device and a stowed position in which the majority of the stem is stowed within the handlebar end.

6. A bicycle light as claimed in claim 4, wherein said one end of the stem is releasably attachable to the light head.

7. A bicycle light as claimed in claim 4, further including a battery pack for powering the light head.

8. A bicycle light as claimed in claim 7, wherein the battery pack is arranged to be housed inside the tubular handlebar end.

9. A bicycle light as claim in claim 8, wherein the stem includes conductors for supplying electricity from the battery pack to the light head.

10. A bicycle light as claimed in claim 4, wherein the light head is operable to emit orange light in one direction and in the opposite direction.

11. A bicycle light as claimed in claim 4, wherein the light head is operable to emit light of one colour in one direction and light of another, different colour in the opposite direction.

12. A bicycle light as claimed in claim 11, wherein said one colour is white, or tinted white, and said other colour is red.

13. A bicycle light as claimed in claim 11, wherein the stem is movable between an in-use position in which the stem projects substantially from the attaching device and a stowed position in which the majority of the stem is stowed within the handlebar end.

14. A bicycle light as claimed in claim 1, wherein said one end of the stem is releasably attachable to the light head.

15. A bicycle light as claimed in claim 11, further including a battery pack for powering the light head, the battery pack being arranged to be housed inside the tubular handlebar end.

16. A bicycle light as claimed in claim 15, wherein the stem includes conductors for supplying electricity from the battery pack to the light head.

17. A bicycle light as claimed in claim 3, wherein said one colour is white, or tinted white, and said other colour is red.

18. A bicycle light as claimed in claim 3, further including a battery pack for powering the light head.

19. A bicycle light as claimed in claim 18, wherein the battery pack is arranged to be housed inside the tubular handlebar end.

* * * * *